(12) United States Patent
Kim

(10) Patent No.: US 8,765,285 B2
(45) Date of Patent: Jul. 1, 2014

(54) SECONDARY BATTERY MODULE

(75) Inventor: Myungchul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 345 days.

(21) Appl. No.: 12/815,587

(22) Filed: Jun. 15, 2010

(65) Prior Publication Data

US 2011/0189531 A1 Aug. 4, 2011

(30) Foreign Application Priority Data

Feb. 1, 2010 (KR) ........................ 10-2010-0009201

(51) Int. Cl.
*H01M 2/14* (2006.01)
*H01M 2/02* (2006.01)
*H01M 6/50* (2006.01)

(52) U.S. Cl.
USPC ........... 429/129; 429/158; 429/149; 429/148; 429/160

(58) Field of Classification Search
USPC ......... 429/156, 158, 159, 120, 186, 176, 153, 429/152, 148, 59, 177, 129, 130, 143
See application file for complete search history.

(56) References Cited

U.S. PATENT DOCUMENTS 3,206,170 A * 9/1965 Schippers et al. ............ 366/340
5,800,942 A 9/1998 Hamada et al.
2005/0287426 A1 * 12/2005 Kim et al. ..................... 429/149
2006/0154136 A1 * 7/2006 Ge et al. ......................... 429/97
2007/0178377 A1 * 8/2007 Kim et al. ..................... 429/152
2008/0248377 A1 * 10/2008 Hashida ........................ 429/99

FOREIGN PATENT DOCUMENTS

| CN | 2770102 Y | 1/2005 |
| CN | 101013748 A | 2/2007 |
| JP | 2000-048867 | 2/2000 |
| JP | 2003-323871 | 11/2003 |
| JP | 2006-012847 | 1/2006 |
| JP | 2008-108651 | 5/2008 |
| WO | WO 94/02969 A1 | 2/1994 |

OTHER PUBLICATIONS

Machine Translation of Kim et al. (JP 2006-012847, published Jan. 2006, pp. 1-25).*
Machine Translation of Kim (KR 10-2007-0025736, published Mar. 2007, pp. 1-18).*
European Office Action dated Apr. 14, 2011 issued to corresponding application EP 10-170-554.9-2119, listing the cited reference in this IDS, 4 pages.
English Machine Translation of Japanese Publication JP2000-048867 listed above.
Extended European Search Report dated Oct. 4, 2010 issued by the EPO for the Priority Korean Patent Application No. 10170554.9, 6 pages.

(Continued)

*Primary Examiner* — Basia Ridley
*Assistant Examiner* — Caitlin Wilmot
(74) *Attorney, Agent, or Firm* — Christie, Parker & Hale, LLP

(57) ABSTRACT

A secondary battery module includes a plurality of unit cells; a first barrier located between adjacent ones of the unit cells; a second barrier located between adjacent ones of the unit cells and spaced from the first barrier; and spacers located between the first barrier and the second barrier.

17 Claims, 17 Drawing Sheets

(56) References Cited

OTHER PUBLICATIONS

Patent Abstracts of Japan, and English machine translation of Japanese Publication 2003-323871 listed above, (7 pages).
Patent Abstracts of Japan, and English machine translation of Japanese Publication 2008-108651 listed above, (19 pages).
Machine English Translation of JP2000-048867, Patent Abstracts of Japan, 6 pages.
First Office Action (with English translation) dated Mar. 28, 2013 issued in the Chinese Patent Application No. 201010608706.8, 23 pages.

* cited by examiner

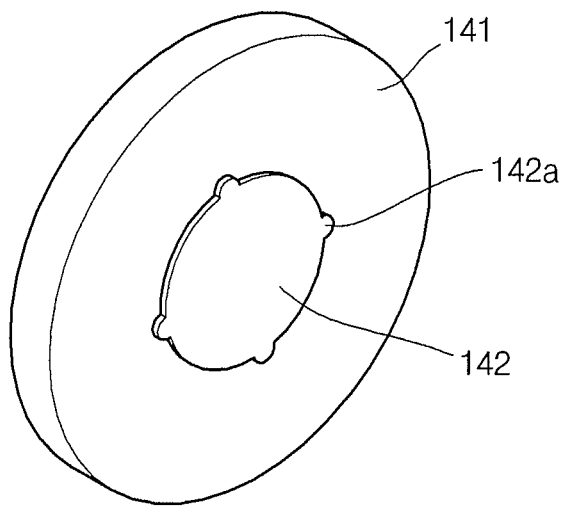

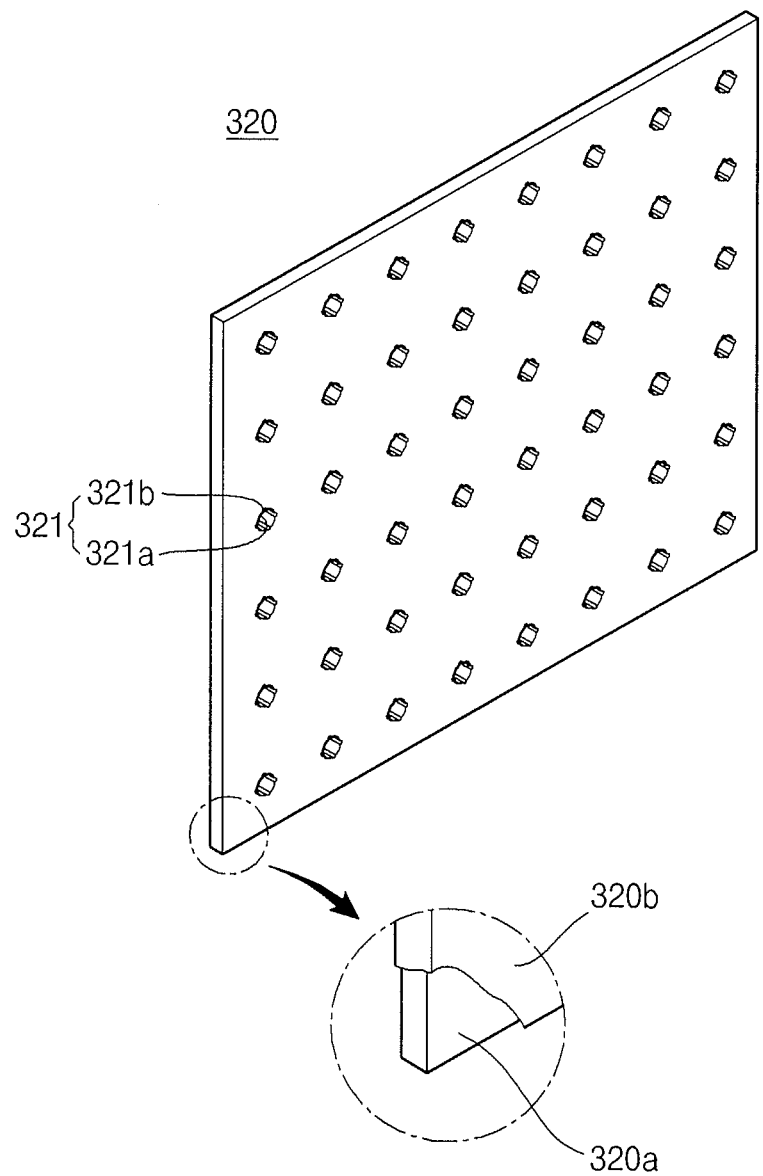

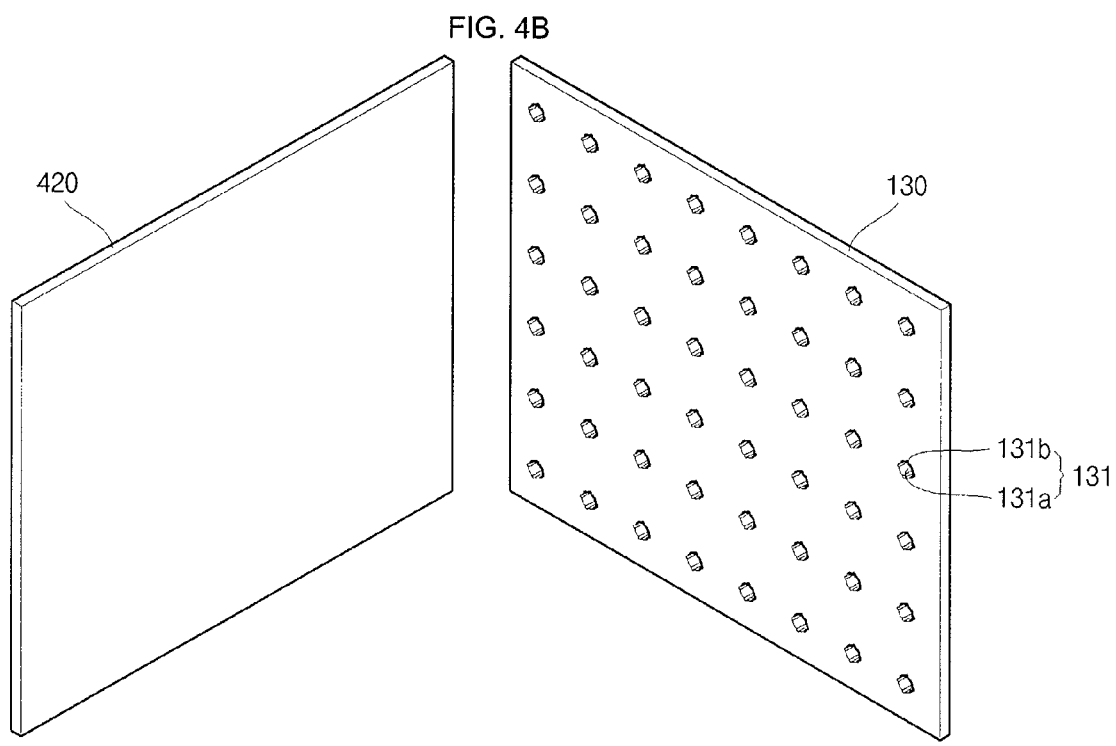

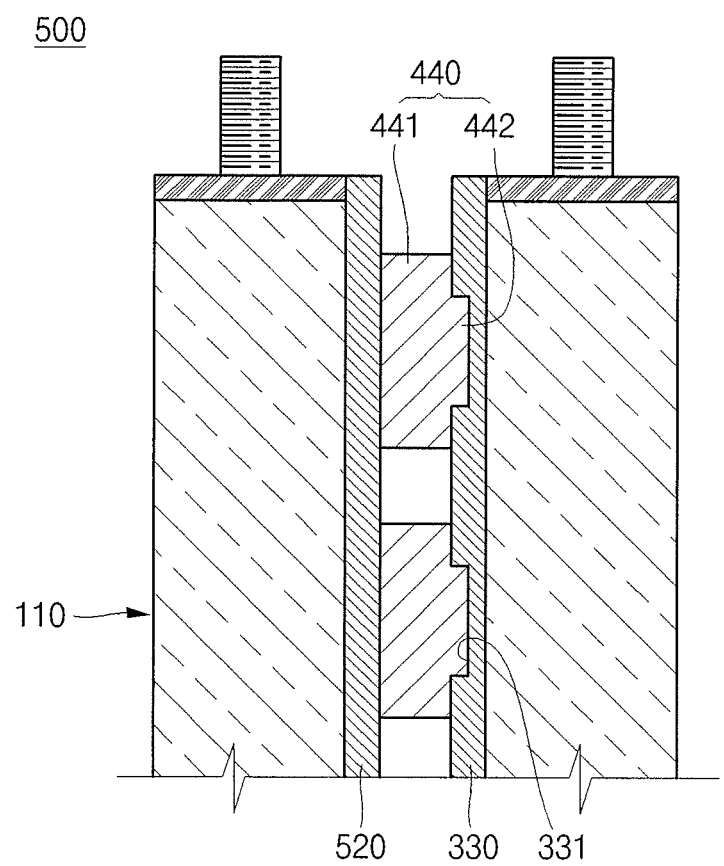

SECONDARY BATTERY MODULE

CROSS-REFERENCE TO RELATED APPLICATION

This application claims priority to and the benefit of Korean Patent Application No. 10-2010-0009201, filed on Feb. 1, 2010, the entire content of which is incorporated herein by reference.

BACKGROUND

1. Field

Aspects of the present invention relate to a secondary battery module.

2. Description of the Related Art

Non-aqueous electrolyte secondary (rechargeable) batteries of high energy density have recently been developed as high power secondary batteries. Several to tens of the high power secondary batteries are typically serially connected to form one module for motor drive of the machines requiring high power source such as hybrid electric vehicles (HEVs).

Secondary batteries are manufactured in various shapes. Generally, a secondary battery may be classified as a cylindrical shape battery or a prismatic shape battery, depending on the external shape of the battery.

A high-capacity secondary battery (hereinafter referred to as a 'battery module' throughout the specification) is composed of a plurality of secondary batteries (hereinafter referred to as 'unit cells' throughout the specification) which are generally connected in series.

In general, barriers as heat transfer means are located between unit cells such that air flows through the barriers to cool the unit cells. When the respective unit cells are repeatedly charged and discharged, a large amount of heat is generated and swelling may occur. Accordingly, there is a need for a battery barrier capable of efficiently dissipating the heat and minimizing the occurrence of swelling.

SUMMARY

According to embodiments of the present invention a secondary battery module is provided capable of preventing or reducing the likelihood of unit cells constituting the secondary battery module from being damaged due to external impacts and vibration and one that is capable of efficiently dissipating the internal heat generated from unit cells to the exterior.

In one embodiment, a secondary battery module includes a plurality of unit cells; a first barrier located between adjacent ones of the unit cells; a second barrier located between adjacent ones of the unit cells and spaced from the first barrier; and spacers located between the first barrier and the second barrier.

In embodiments, each of the spacers comprises a spacer body; and a protrusion protruding from either one or two surfaces of the spacer body, the protrusion having an area smaller than an area of the spacer body. The protrusion may have inserts thereon, and the inserts may be on an outer circumference of the protrusion and are formed on two surface of the spacer body. Further, the first barrier and the second barrier may include an insert hole or an insert groove generally corresponding to each insert and a protrusion hole or a protrusion groove generally corresponding to each protrusion.

In one embodiment, the first barrier and the second barrier each include a metal plate and an oxide layer on a surface of the metal plate, wherein the metal plate is made of aluminum. Further, in one embodiment, wherein the spacers are located between the first and second barriers such that a substantially constant distance is maintained between the first and second barriers.

In one embodiment, a secondary battery module includes a plurality of unit cells spaced from each other; a first barrier located between adjacent ones of the unit cells; a second barrier located between adjacent ones of the unit cells and spaced from the first barrier; and spacers between the first barrier and the second barrier, wherein a plurality of protrusions extend from the first barrier toward the second barrier and from the second barrier toward the first barrier.

In one embodiment, each of the spacers include a protrusion hole engaged with each protrusion. Further, the first barrier and the second barrier may further include inserts on outer circumferences of the protrusions, and each of the spacers may include an insert hole generally corresponding to each insert.

BRIEF DESCRIPTION OF THE DRAWINGS

The objects and features of the present invention will be more apparent from the following detailed description in conjunction with the accompanying drawings, in which:

FIG. 1E is an enlarged view of a spacer shown in FIG. 1A;

FIG. 3A is a perspective view of a first barrier of a secondary battery module according to still another embodiment of the present invention;

FIG. 4B is a perspective view of first and second barriers of the secondary battery module shown in FIG. 4A;

FIG. 5 is a cross-sectional view of a secondary battery module a still further embodiment of the present invention;

DETAILED DESCRIPTION

Embodiments of the present invention will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1A:
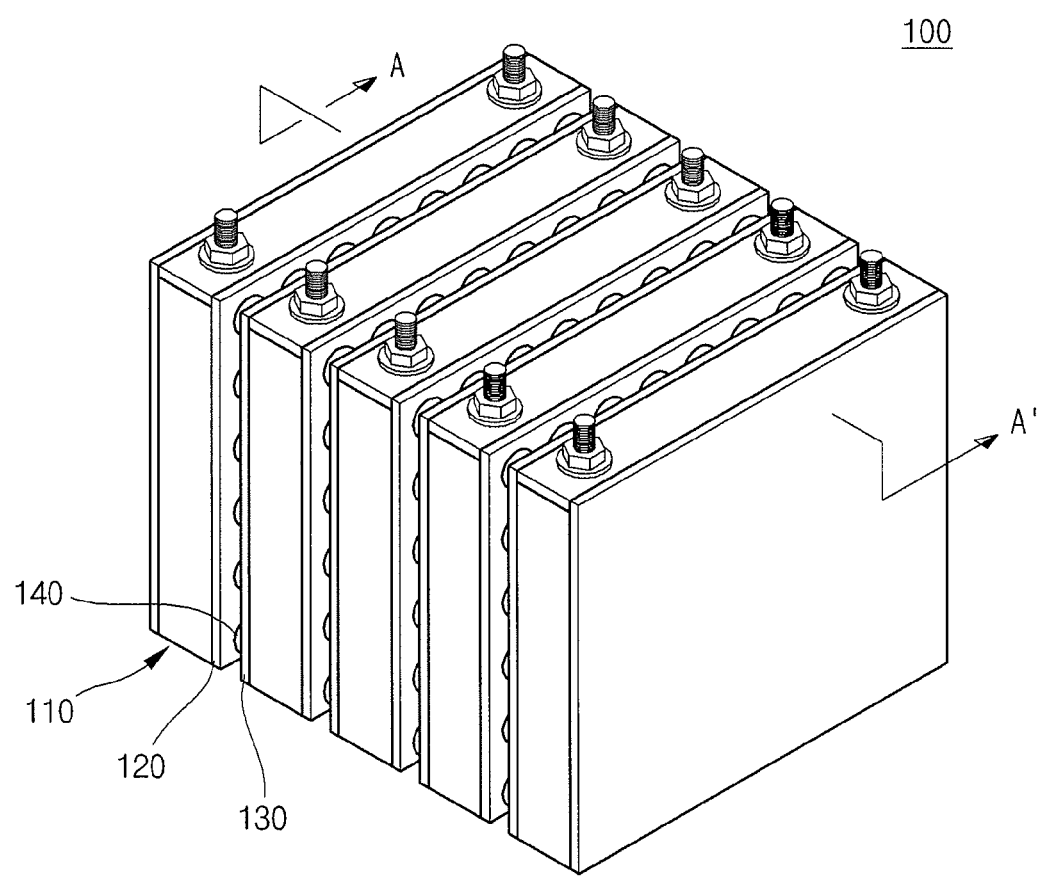
FIG. 1A is a perspective view of a secondary battery module according to an embodiment of the present invention.
Figure 1B:
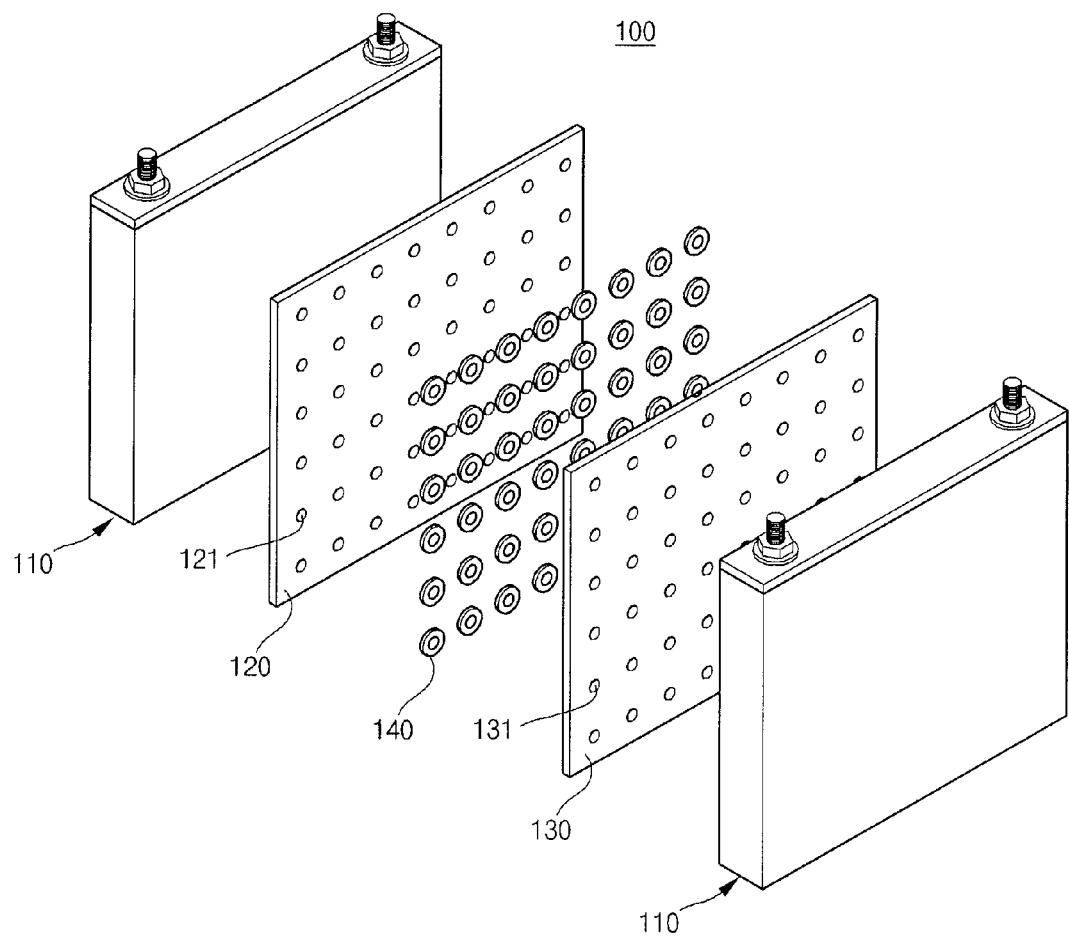
FIG. 1B is an exploded perspective view of the secondary battery module shown in FIG. 1A.
Figure 1C:
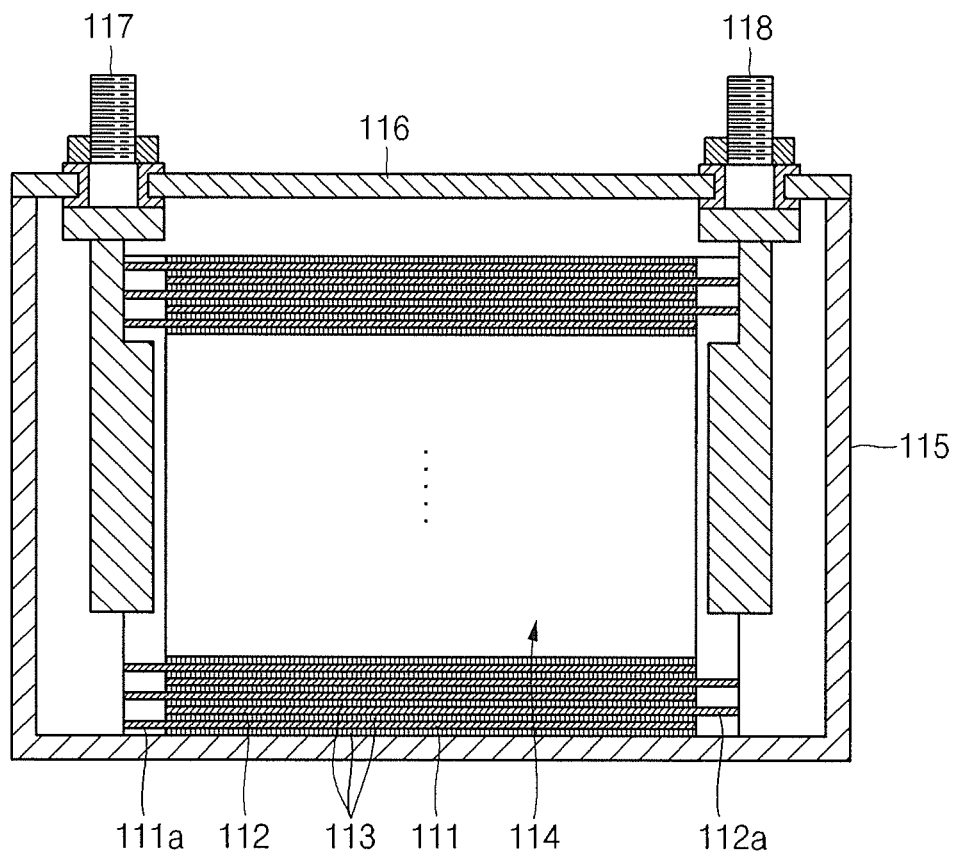
FIG. 1C is a cross-sectional view of a unit battery shown in FIG. 1A.
Figure 1D:
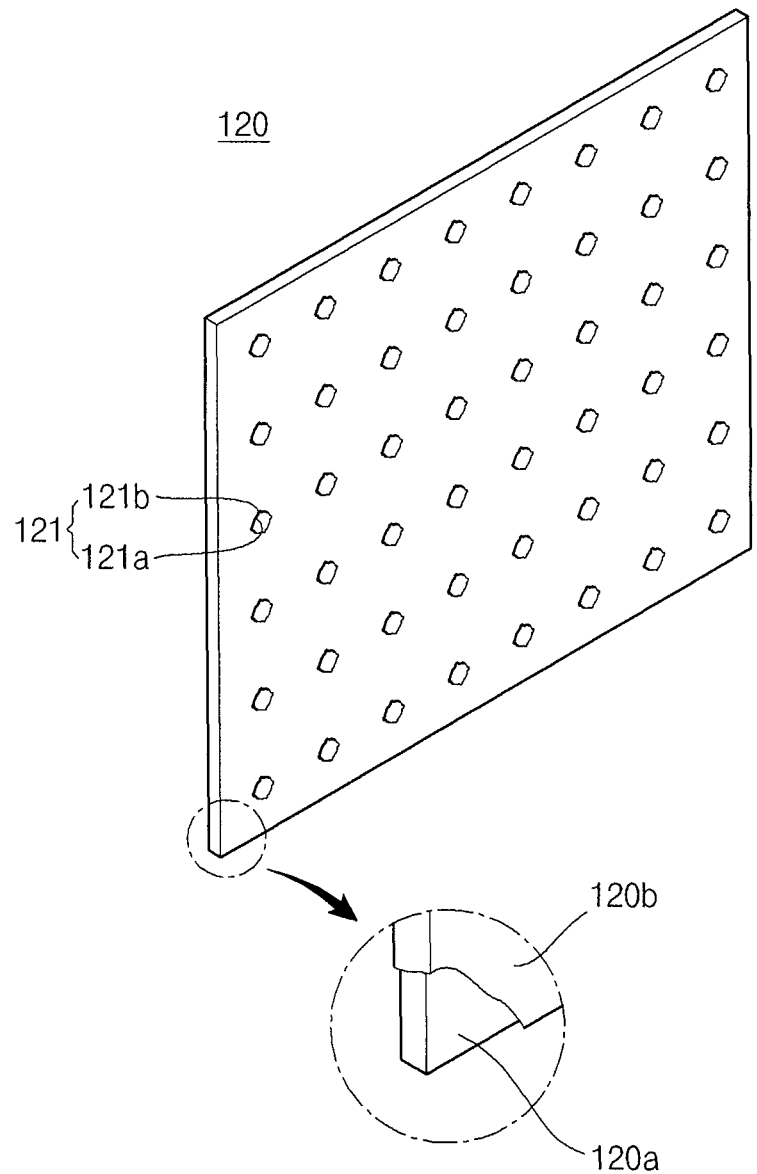
FIG. 1D is a perspective view of a first barrier shown in FIG. 1A.
Figure 1F:
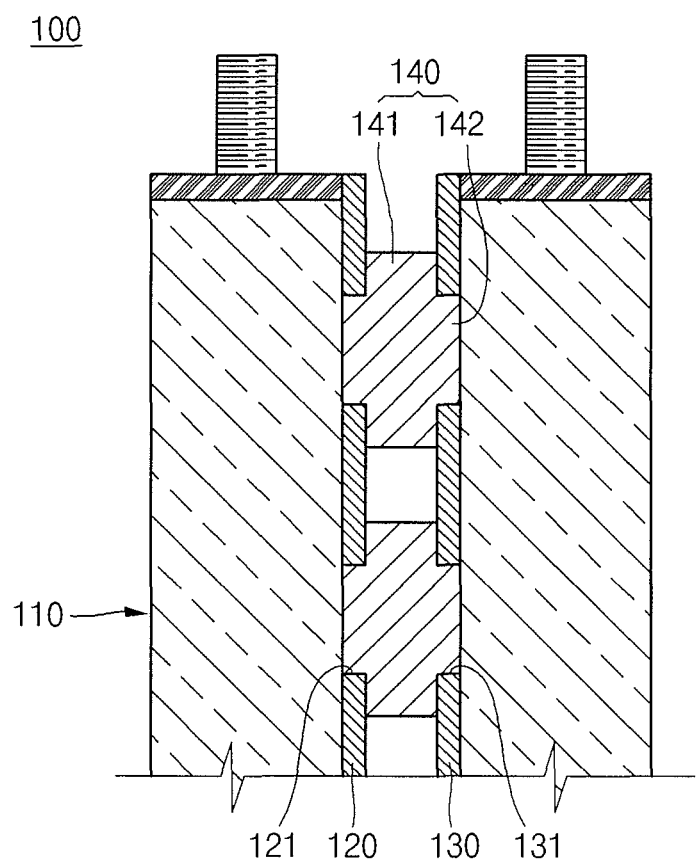
FIG. 1F is a cross-sectional view of the secondary battery module taken along the line A-A' of FIG. 1A.

FIG. 1A is a perspective view of a secondary battery module according to one embodiment of the present invention, FIG. 1B is an exploded perspective view of the secondary battery module shown in FIG. 1A, FIG. 1C is a cross-sectional view of a unit battery shown in FIG. 1A, FIG. 1D is a perspective view of a first barrier shown in FIG. 1A, FIG. 1E is an enlarged view of a spacer shown in FIG. 1A, and FIG. 1F is a cross-sectional view of the secondary battery module taken along the line A-A' of FIG. 1A.

Referring to FIGS. 1A through 1F, the secondary battery module 100 according to one embodiment of the present invention includes unit cells 110, a first barrier 120, a second barrier 130, and spacers 140.

Each of the unit cells 110 includes an electrode assembly 114 having a positive electrode plate 111, a negative electrode plate 112, and a separator 113 between the positive electrode plate 111 and the negative electrode plate 112, a case 115 having a space for accommodating the electrode assembly, a cap plate 116 coupled to the case 115 and sealing the same, and positive/negative terminals 117 and 118 electrically connected to the positive/negative electrode plates 111 and 112, respectively, and protruding outwardly from the cap plate 116.

The positive electrode plate 111 is formed by coating a positive electrode active material such as a transition metal oxide on a positive electrode collector formed of a metal foil made of, for example, aluminum (Al), and includes a positive electrode non-coating portion 111a that is not coated with the positive electrode active material. The positive electrode non-coating portion 111a is formed on a lateral surface of the positive electrode plate 111 in a lengthwise direction of the positive electrode plate 111. The positive electrode non-coating portion 111a serves as a flow channel of current flowing between the positive electrode plate 111 and the positive terminal 117. However, aspects of the present invention are not limited to the exemplary material of the positive electrode plate 111.

The negative electrode plate 112 is formed by coating a negative electrode active material such as graphite or carbon on a negative electrode collector formed of a metal foil made of, for example, nickel (Ni) or copper (Cu), includes a negative electrode non-coating portion 112a that is not coated with the negative electrode active material. The negative electrode non-coating portion 112a is formed on a lateral surface of the negative electrode plate 112 in a lengthwise direction of the negative electrode plate 112. The negative electrode non-coating portion 112a serves as a flow channel of current flowing between the negative electrode plate 112 and the negative terminal 118. However, aspects of the present invention are not limited to the exemplary materials of the negative electrode plate 112.

The separator 113, positioned between the positive electrode plate 111 and the negative electrode plate 112, prevents an electrical short-circuit therebetween and allows for movement of lithium ions. In one embodiment, the separator 113 is made of polyethylene, polypropylene, and a composite film of polyethylene and polypropylene. However, aspects of the present invention are not limited to the exemplary materials of the separator 113.

The electrode assembly 114 may be formed by winding together the positive electrode plate 111, the negative electrode plate 112, and the separator 113 between the positive electrode plate 111 and the negative electrode plate 112 in a jelly-roll configuration, with the separator electrically insulating the positive electrode plate 111 and the negative electrode plate 112 from each other. Alternatively, the electrode assembly 114 may be flatly compressed to be encased in a case 115 of a prismatic shape by, for example, a pressing process.

The case 115 is made of a conductive metal, such as Al, Al alloy, or Ni-coated steel, and is formed in a substantially hexahedral shape having an opening to receive the electrode assembly 114, the positive terminal 117, the negative terminal 118, and electrolyte. While the opening is not shown in FIG. 1C, in which the case 115 and cap plate 116 are shown coupled, the edge portion of the cap plate 116 is actually an open portion. An inner surface of the case 115 is treated for insulation to be electrically insulated from the electrode assembly 114, the positive terminal 117 and the negative terminal 118.

The cap plate 116 seals the opening of the case 115, and may be made of the same material as the case 115. In addition, the cap plate 116 may include a plug for closing an electrolyte inlet and a safety vent.

The positive terminal 117 is electrically connected to the positive electrode plate 111 and protrudes outwardly from the cap plate 116. That is, one end of the positive terminal 117 is welded to the positive electrode non-coating portion 111a to be connected to the positive electrode plate 111 and the other end of the positive terminal 117 extends through the cap plate 116 to protrude outwardly from the cap plate 116.

The negative terminal 118 is electrically connected to the negative electrode plate 112 to protrude outwardly from the cap plate 116. That is, one end of the negative terminal 118 is welded to the negative electrode non-coating portion 112a to be connected to the negative electrode plate 112 and the other end of the negative terminal 118 extends through the cap plate 116 to then protrude outwardly from the cap plate 116.

The first barrier 120 is between adjacent unit cells 110, and one surface of the first barrier 120 is combined with one surface of one of the adjacent unit cells 110. The first barrier 120 may be sized to have an area substantially the same as or greater than the surface of the unit cell 110 to which it corresponds.

The first barrier 120 may include a metal plate 120a and an oxide layer 120b formed on a surface of the metal plate 120a. The metal plate 120a is made of aluminum (Al), and has excellent thermal conductivity, thereby efficiently cooling the unit cells 110. The oxide layer 120b is a coating formed by anodizing the surface of the metal plate 120a. Here, the anodizing is performed such that a surface of an aluminum body used as a positive electrode is oxidized by the oxygen produced when the aluminum body is conducted in electrolyte to yield a coating of aluminum oxide ($Al_2O_3$). The most typically used material in the anodizing treatment is aluminum (Al). In addition, the anodizing treatment may be performed on a metal body made of manganese (Mn), zinc (Zn), titanium (Ti), hafnium (Hf), niobium (Nb), or the like. The oxide layer 120b has very high mechanical strength and superb corrosion resistance and abrasion resistance. That is, the first barrier 120 is made of aluminum having excellent thermal conductivity so that it can efficiently dissipate the heat generated from the unit cells 110. In addition, the first barrier 120 can prevent or reduce the likelihood of an electrical short-circuit between the unit cells 110 due to the oxide layer 120b on its surface.

In addition, the first barrier 120 includes spacer holes 121 arranged at a predetermined distance, the spacer holes 121 corresponding to the spacers 140. Each of the spacer holes 121 includes a protrusion hole 121a and an insert hole 121b corresponding respectively to a protrusion 142 of each of the spacers 140 and inserts 142a formed on the protrusion 142. The spacer 140 is fitted into the spacer hole 121 formed in the first barrier 120. Here, since the insert 142a is fitted into the insert hole 121b, the spacer 140 can be securely fixed and substantially prevented from being moved or rotated.

The second barrier 130 is between the unit cells 110 and spaced from the first barrier 120. In addition, the second barrier 130 includes spacer holes 131 spaced from each other, the spacer holes 131 corresponding to the spacers 140. In other words, the spacer holes 121 of the first barrier 120 correspond to the spacer holes 131 of the second barrier 130.

Since the second barrier 130 has substantially the same configuration and functions as the first barrier 120, repetitive descriptions thereof will not be given.

The spacers 140 are formed between the first barrier 120 and the second barrier 130. Each of the spacers 140 includes a spacer body 141 and a protrusion 142 protruding from both planar surfaces of the spacer body 141, the protrusion having a smaller area than an area of the spacer body 141. The spacers 140 are fitted into the spacer holes 121 and 131 formed in the first barrier 120 and the second barrier 130. The spacers 140 are formed of insulators and prevent or reduce a likelihood of an electrical short-circuit between the unit cells 110. The spacers 140 may be made of plastic (polymer resin) or silicon, but aspects of the present invention are not limited thereto.

The spacer body 141 is formed in a generally circular shape and has a predetermined thickness. In the illustrated embodiment, the spacer body 141 has a circular shape, but is not limited thereto and may have one of various shapes, including a triangular shape, a rectangular shape, a pentagonal shape, and so on.

The protrusion 142 protrudes from both planar surfaces of the spacer body 141 and, in one embodiment, a protruding distance of the protrusion 142 is less than a thickness of the spacer body 141. In addition, inserts 142a are positioned on the outer circumference of the protrusion 142 and are formed on both surfaces of the spacer body 141. In one embodiment, the inserts 142a are formed on the spacer body 141 extending in a radial direction from the center to the exterior side of the protrusion 142. The protrusion 142 is engaged with the protrusion hole 121a and, more specifically, the protrusion 142 is fitted into the protrusion hole 121a to be close contact with the unit cells 110. The inserts 142a are engaged with the insert holes 121b, and more specifically, the inserts 142a are inserted into the insert holes 121b to be close contact with the unit cells 110, thereby securely fixing the spacers 140 without being moved.

That is, the spacers 140 are combined with the first barrier 120 such that the protrusion 142 and the inserts 142a are fitted and inserted respectively into the protrusion hole 121a and the insert holes 121b.

With the aforementioned configuration, the first barrier 120 is coupled to one surface of each of the unit cells 110 and the second barrier 130 is coupled to the other surface thereof. In addition, the spacers 140 are engaged with the spacer holes 121 and 131 formed in the first barrier 120 and the second barrier 130. That is, the unit cells 110 are in surface-contact with the first and second barriers 120 and 130, thereby preventing or reducing the likelihood that the unit cells will be damaged due to external impacts and vibration. In addition cooling channels, through which the heat generated from the unit cells 110 can be dissipated, are formed by locating the spacers 140 between the first barrier 120 and the second barrier 130.

As described above, in the secondary battery module 100 according to an embodiment of the present invention, the unit cells 110 are in surface-contact with the first and second barriers 120 and 130, it is possible to prevent the unit cells 110 from being damaged due to external impact and vibration.

In addition, the secondary battery module 100 includes cooling channels formed by locating the spacers 140 between the first barrier 120 and the second barrier 130 by an equal distance, thereby dissipating the heat generated from the unit cells 110.

Hereinafter, a secondary battery module according to another embodiment of the present invention will be described.

Figure 2:
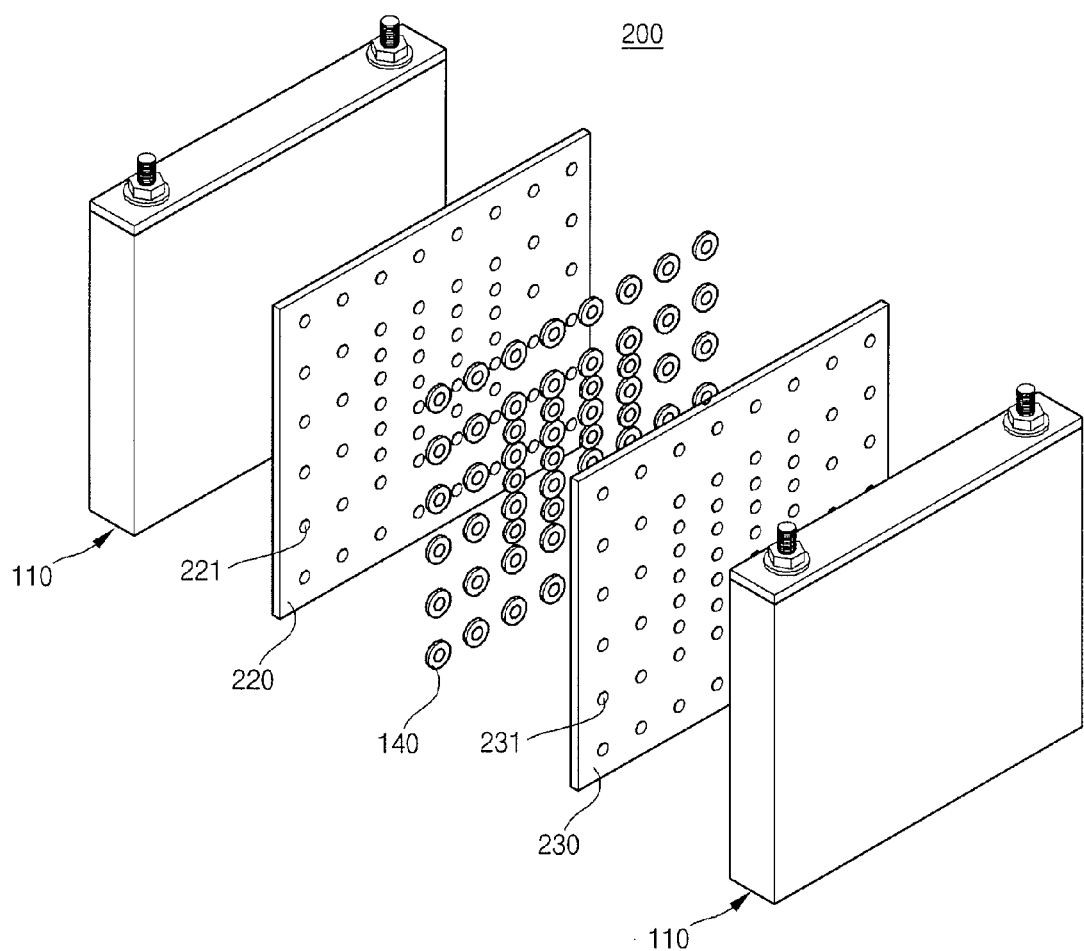
FIG. 2 is an exploded perspective view of a secondary battery module according to another embodiment of the present invention.

FIG. 2 is an exploded perspective view of a secondary battery module according to another embodiment of the present invention.

The secondary battery module 200 is substantially the same as the secondary battery module 100 shown in FIGS. 1A through 1F in view of configuration and functions, except for configurations of a first barrier 220 and a second barrier 230. Thus, repetitive explanations will be omitted and the following description will be focused on only the differences; that is, the description will focus on the first barrier 220 and the second barrier 230, Referring to FIG. 2, the first barrier 220 is located between the unit cells 110, and one surface of the first barrier 220 is combined with one surface of each of the unit cells 110.

The first barrier 220 includes a plurality of spacer holes 221 corresponding to the spacers 140 arranged therein. A distance between the spacer holes 221 arranged at a central area of the first barrier 220 is smaller than a distance between spacer holes 221 arranged at a peripheral area thereof. That is, the spacer holes 221 are more densely located at the central area of the first barrier 220.

The spacers 140 are fitted into the spacer holes 221 formed in the first barrier 220. Because the spacer holes 221 are more densely formed at the central area of the first barrier 220 as described above, the spacers 140 are also more densely formed at the central area of the first barrier 220.

The unit cells 110 typically undergo a swelling phenomenon, which may occur to a greater degree at central areas of the unit cells 110. Thus, occurrence of the swelling phenomenon of the unit cells 110 can be minimized by more densely arranging the spacers 140 at the central area of the first barrier 220.

Since the second barrier 230 is substantially the same as the first barrier 220 in view of configuration and functions, repetitive explanations will be omitted.

As described above, in the secondary battery module 200 according to another embodiment of the present invention, the unit cells 110 are in surface-contact with the first and second barriers 220 and 230, it is possible to prevent or reduce the likelihood that the unit cells 110 will be damaged due to external impacts or vibration In addition, since the secondary battery module 200 includes the spacers 140 more densely formed at the central areas of the first and second barriers 220 and 230, occurrence of the swelling phenomenon of the unit cells 110 can be minimized.

Hereinafter, a secondary battery module according to still another embodiment of the present invention will be described.

Figure 3B:
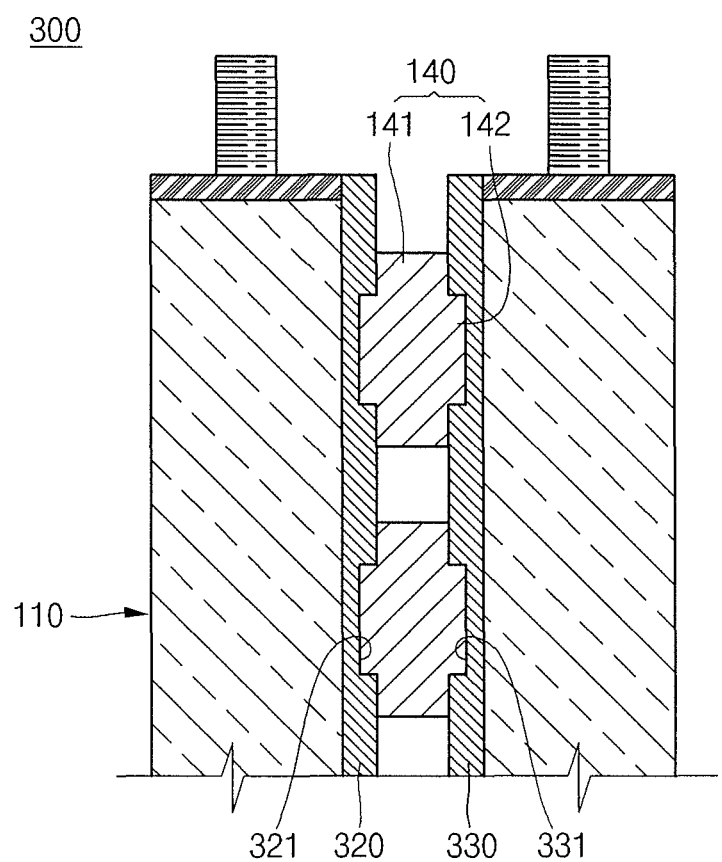
FIG. 3B is a cross-sectional view of the secondary battery module shown in FIG. 3A.

FIG. 3A is a perspective view of a first barrier of a secondary battery module according to still another embodiment of the present invention, and FIG. 3B is a cross-sectional view of the secondary battery module shown in FIG. 3A.

The secondary battery module 300 is substantially the same as the secondary battery module 100 shown in FIGS. 1A through 1F in view of configuration and functions, except for configurations of a first barrier 320 and a second barrier 330. Thus, repetitive explanations will be omitted and the following description will be focused on only the differences; that is, the description will focus on the first barrier 320 and the second barrier 330.

Referring to FIGS. 3A and 3B, the first barrier 320 is located between the unit cells 110, and one surface of the first barrier 320 is combined with one surface of one of the unit cells 110. In other words, a surface of the first barrier 320 is in contact with substantially an entire surface of the unit cell 110.

In addition, the first barrier 320 includes a plurality of spacer grooves 321 corresponding to the spacers 140 arranged therein at an equal distance. The spacer grooves 321 include a protrusion groove 321a corresponding to a protrusion 142, and insert grooves 321b corresponding to inserts 142a. The spacers 140 are fitted into the spacer grooves 321 formed in the first barrier 320. Here, since the inserts 142a are fitted into the insert grooves 321b, the spacers 140 can be securely fixed without becoming dislodged.

The second barrier 330 is located between the unit cells 110 and spaced from the first barrier 320. In addition, the second barrier 330 includes spacer holes 331 arranged at an equal distance, the spacer holes 131 corresponding to the spacers 140. In other words, the spacer grooves 321 of the first barrier 320 correspond to the spacer grooves 331 of the second barrier 330.

Since the second barrier 330 has substantially the same configuration and functions as the first barrier 320, repetitive descriptions thereof will not be given.

As described above, in the secondary battery module 300 according to an embodiment of the present invention, the unit cells 110 are in surface-contact with the first and second barriers 320 and 330, it is possible to prevent or reduce the likelihood that the unit cells 110 will be damaged due to external impacts and vibration.

In addition, the secondary battery module 300 includes the cooling channels formed by locating the spacers 140 between the first barrier 320 and the second barrier 330 at the same distance, thereby dissipating the heat generated from the unit cells 110.

Hereinafter, a secondary battery module according to a further embodiment of the present invention will be described.

Figure 4A:
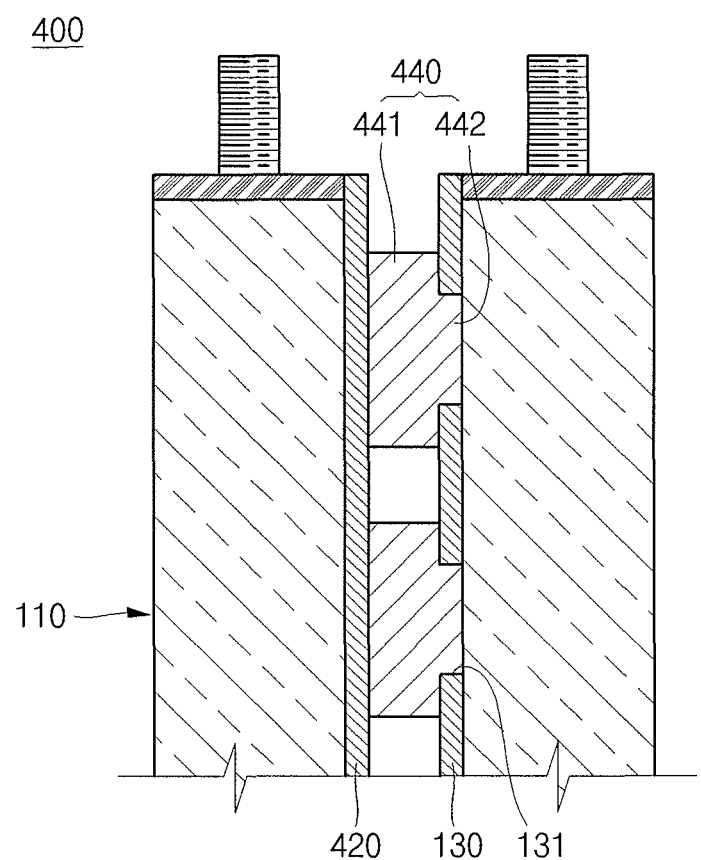
FIG. 4A is an exploded perspective view of a secondary battery module according to a further embodiment of the present invention.
Figure 4C:
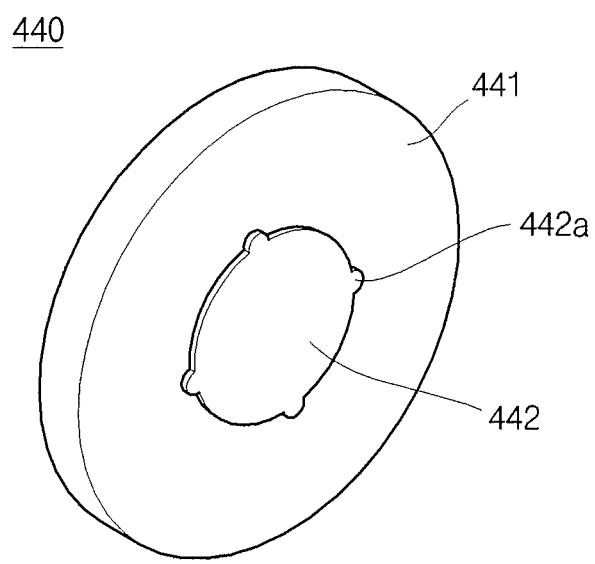
FIG. 4C is a perspective view of a spacer shown in FIG. 4A.

FIG. 4A is an exploded perspective view of a secondary battery module according to a further embodiment of the present invention, FIG. 4B is a perspective view of first and second barriers of the secondary battery module shown in FIG. 4A, and FIG. 4C is a perspective view of a spacer shown in FIG. 4A.

The secondary battery module 400 is substantially the same as the secondary battery module 100 shown in FIGS. 1A through 1F in view of configuration and functions. Thus, repetitive explanations will be omitted and the following description will be focused on only the differences therebetween.

Referring to FIGS. 4A through 4C, the secondary battery module 400 includes unit cells 110, a first barrier 420, a second barrier 130, and spacers 440.

The first barrier 420 is located between the unit cells 110 and is formed in a flat rectangular plate shape. One surface of the first barrier 420 is combined with one surface of the unit cell 110, and the other surface of the first barrier 420 is combined with surfaces of the spacers 440 without the protrusion 442.

The second barrier 130 is located between the unit cells 110 and is spaced from the first barrier 420. In addition, the second barrier 130 includes spacer holes 131 corresponding to the spacers 440 arranged at an equal distance.

Here, the first barrier 420 and the second barrier 130 may be reversed.

The spacers 440 are formed between the first barrier 420 and the second barrier 130. Each of the spacers 440 includes a spacer body 441, and a protrusion 442 protruding from one surface of the spacer body 441 and having a smaller area than an area of the spacer body 441.

The spacers 440 are fitted into the spacer holes 131 formed in the second barrier 130. The spacers 440 are formed of insulators and prevent an electrical short-circuit between the unit cells 110.

The protrusion 442 protrudes from one surface of the spacer body 441 and protrudes a distance less than a thickness of the spacer body 441. In addition, the inserts 442a are positioned on the outer circumference of the protrusion 442. Like the protrusion 442, the inserts 442a are also formed on one surface of the spacer body 441. That is, the spacers 440 are combined with the second barrier 130 such that the protrusion 442 and the inserts 442a are fitted into the protrusion hole 131a and the insert holes 131b, respectively.

As described above, in the secondary battery module 400 according to a further embodiment of the present invention, the unit cells 110 are in surface-contact with the first and second barriers 420 and 130, it is possible to prevent the unit cells 110 from being damaged due to external impact and vibration.

In addition, the secondary battery module 400 includes the cooling channels formed by locating the spacers 440 between the first barrier 420 and the second barrier 130 at an equal distance, thereby dissipating the heat generated from the unit cells 110.

Next, a secondary battery module according to a yet embodiment of the present invention will be described.

FIG. 5 is a cross-sectional view of a secondary battery module according to a still further embodiment of the present invention.

The secondary battery module 500 is substantially the same as the secondary battery module 300 shown in FIG. 3B in view of configuration and functions. Thus, repetitive explanations will be omitted and the following description will be focused on only the differences therebetween.

Referring to FIG. 5, the secondary battery module 500 includes unit cells 110, a first barrier 520, a second barrier 330 and spacers 440.

The first barrier 520 is located between the unit cells 110 and is formed in a flat rectangular plate shape. One surface of the first barrier 520 is combined to cover substantially an entire surface of the unit cell 110, and the other surface of the first barrier 520 is combined with surfaces of the spacers 440 without the protrusion 442.

The second barrier 330 is located between the unit cells 110 and is spaced from the first barrier 420. The second barrier 330 covers substantially an entire surface of the unit cell 110 and includes spacer grooves 331 corresponding to the spacers 440 spaced at an equal distance.

Here, the first barrier 520 and the second barrier 330 may be reversed.

The spacers 440 are formed between the first barrier 520 and the second barrier 330. Each of the spacers 440 includes a spacer body 441, and a protrusion 442 protruding from one surface of the spacer body 441 in a smaller size than the spacer body 441.

The spacers 440 are fitted into the spacer grooves 331 formed in the second barrier 330. The spacers 440 are formed of insulators and prevent an electrical short-circuit between the unit cells 110.

As described above, in the secondary battery module 500 according to a still further embodiment of the present invention, the unit cells 110 are in surface-contact with the first and second barriers 520 and 330, allowing the barriers to prevent the unit cells 110 from being significantly damaged due to external impact and vibration.

In addition, the secondary battery module 500 includes the cooling channels formed by locating the spacers 440 between the first barrier 520 and the second barrier 330 at substantially an equal distance, thereby dissipating the heat generated from the unit cells 110.

Hereinafter, a secondary battery module according to yet another embodiment of the present invention will be described.

Figure 6A:
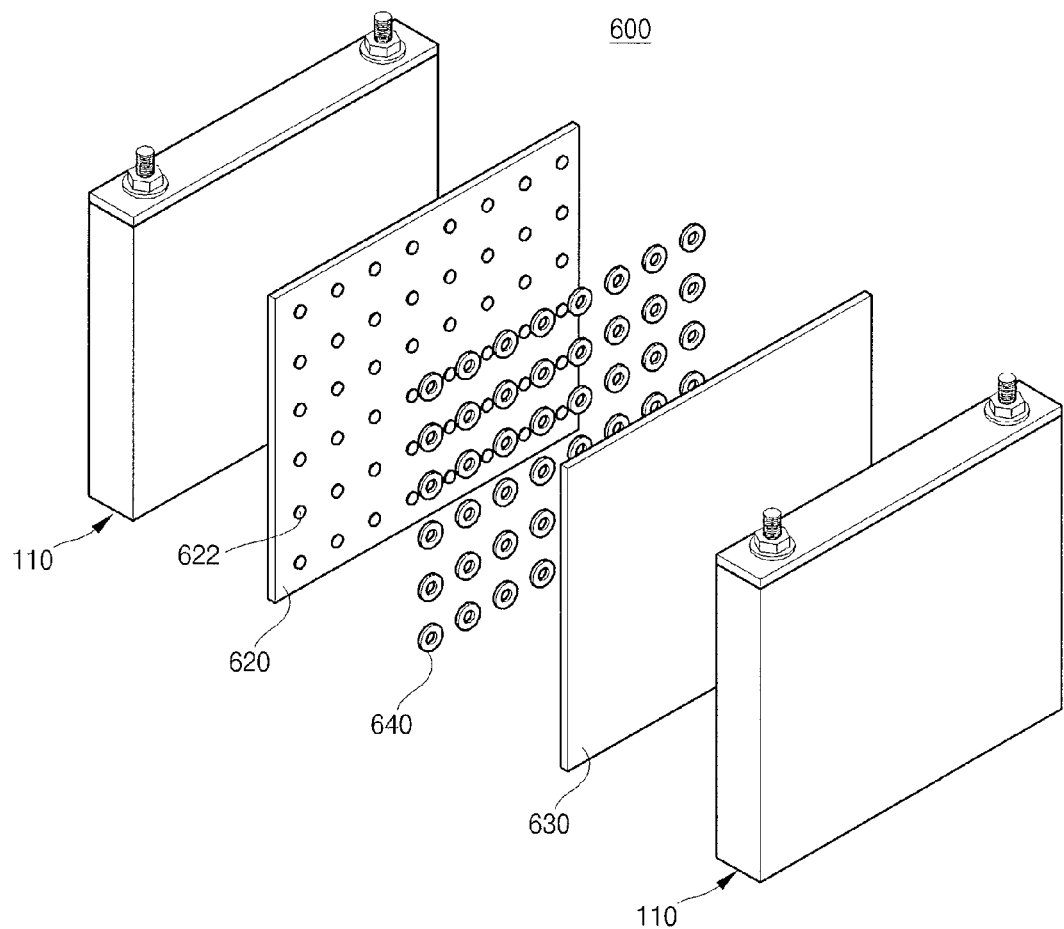
FIG. 6A is an exploded perspective view of a secondary battery module according to yet another embodiment of the present invention.
Figure 6B:
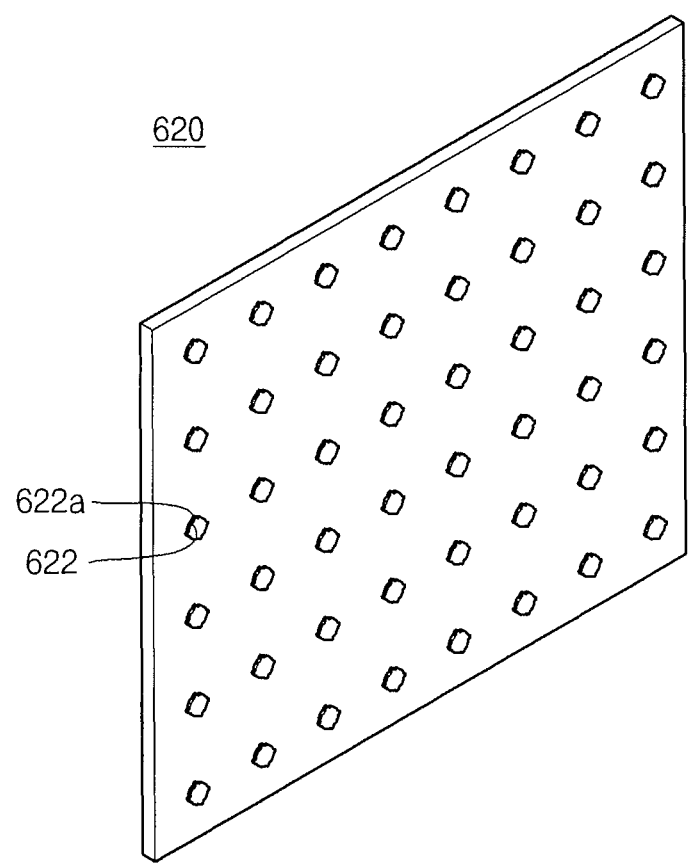
FIG. 6B is a perspective view of a first barrier shown in FIG. 6A.
Figure 6C:
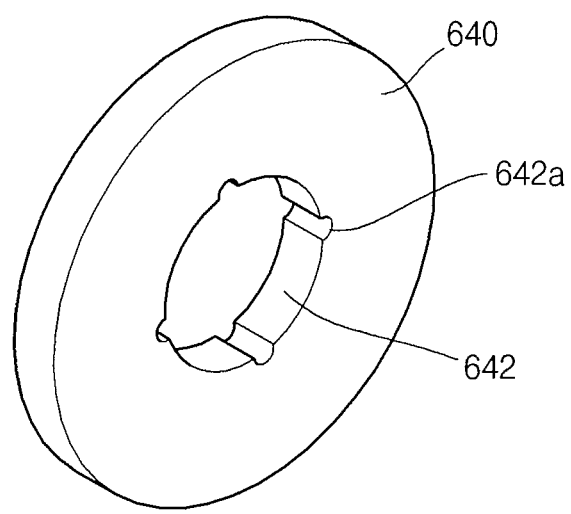
FIG. 6C is an enlarged view of an exemplary spacer shown in FIG. 6A.
Figure 6D:
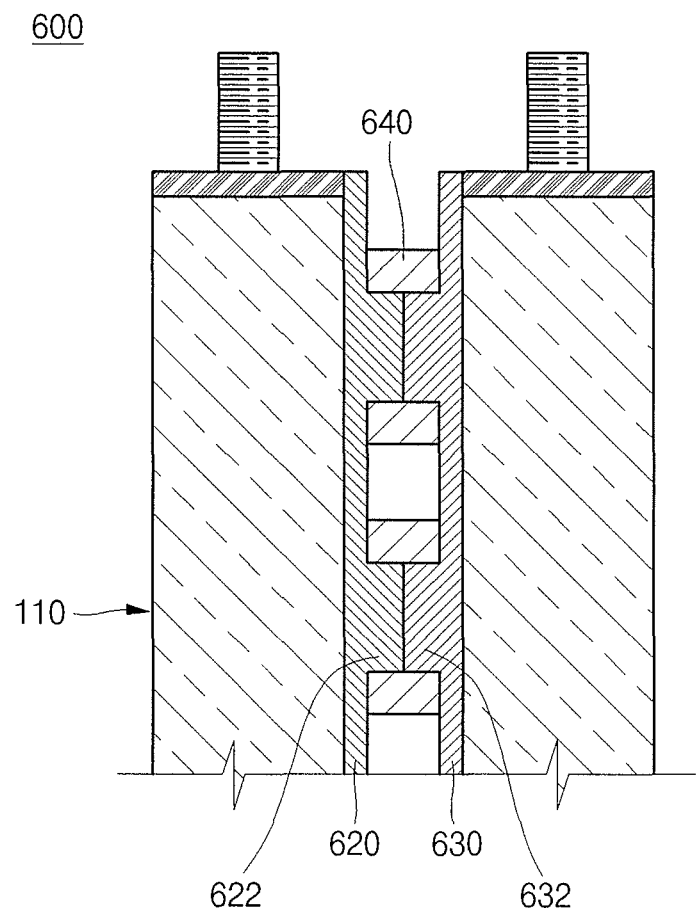
FIG. 6D is a cross-sectional view of the secondary battery module shown in FIG. 6A.

FIG. 6A is an exploded perspective view of a secondary battery module according to yet another embodiment of the present invention, FIG. 6B is a perspective view of a first barrier shown in FIG. 6A, FIG. 6C is an enlarged view of an exemplary spacer shown in FIG. 6A, and FIG. 6D is a cross-sectional view of the secondary battery module shown in FIG. 6A.

Since the secondary battery module 600 substantially the same as the secondary battery module 100 shown in FIGS. 1A through 1F in view of configuration and functions, repetitive explanations will be omitted and the following description will be focused on only the differences therebetween.

Referring to FIGS. 6A through 6D, the secondary battery module 600 includes unit cells 110, a first barrier 620, a second barrier 630 and spacers 640.

The first barrier 620 is located between the unit cells 110 and one surface of the first barrier 620 is combined with one surface of the unit cell 110. The first barrier 620 may have an area that is the same as or smaller than an area of one surface of each of the unit cells 110. A plurality of protrusions 622 outwardly protrude from one surface of the first barrier 620. The plurality of protrusions 622 are engaged with protrusion holes 642 formed in the spacers 640.

Inserts 622a are formed on outer circumferences of the protrusions 622. Like the protrusions 622, the inserts 622a are formed on one surface of the first barrier 620. That is, the inserts 622a are formed on one surface of the first barrier 620 extending in a radial direction from the center to the exterior side of the protrusions 622. The inserts 622a are engaged with insert holes 642a formed in the spacers 640. Here, the inserts 622a are inserted into the insert holes 642a, thereby securely fixing the spacers 640 without being moved.

The second barrier 630 is located between the unit cells 110 and is spaced from the first barrier 620. In addition, the spacers 640 include protrusions 632 formed on one surface thereof, and the protrusions 632 may be in contact with the protrusions 622 of the first barrier 620.

Since the second barrier 630 has the same configuration and functions as the first barrier 320, repetitive descriptions thereof will not be given.

The spacers 640 are formed between the first barrier 620 and the second barrier 630. Each of the spacers 640 includes the protrusion holes 642 corresponding to the protrusions 622 and insert holes 642a corresponding to the inserts 622a.

The spacers 640 are engaged with the protrusions 622 and 632 formed in the first and second barriers 620 and 630, respectively.

A thickness of each of the spacers 640 may be equal to or greater than a sum of thicknesses of each of the protrusions 622 of the first barrier 620 and each of the protrusions 632 of the second barrier 630. In the illustrated embodiment, the thickness of the spacer 640 is substantially equal to the sum of thicknesses of the protrusion 622 of the first barrier 620 and the protrusion 632 of the second barrier 630. If the thickness of the spacer 640 is greater than the sum of thicknesses of the protrusion 622 of the first barrier 620 and the protrusion 632 of the second barrier 630, the protrusion 622 of the first barrier 620 and the protrusion 632 of the second barrier 630 may not come into contact with each other.

As described above, in the secondary battery module 600 according to yet another embodiment of the present invention, the unit cells 110 are in surface-contact with the first and second barriers 620 and 630, it is possible to prevent the unit cells 110 from being damaged due to external impacts and vibration.

In addition, since the secondary battery module 600 includes the cooling channels formed by interposing the spacers 640 between the first barrier 620 and the second barrier 630 at an equal distance, thereby dissipating the heat generated from the unit cells 110.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A secondary battery module comprising:
a plurality of unit cells, each of the unit cells spaced from an adjacent one of the unit cells;
a first barrier located between each adjacent ones of the unit cells;
a second barrier located between adjacent ones of the unit cells and spaced from the first barrier; and
a plurality of spacers located between the first barrier and the second barrier,
wherein each of the spacers comprises:
a spacer body; and
a protrusion protruding from two surfaces of the spacer body, the protrusion having an area smaller than an area of the spacer body, wherein the protrusion has inserts thereon.

2. The secondary battery module of claim 1, wherein the inserts are on an outer circumference of the protrusion and are formed on two surfaces of the spacer body.

3. The secondary battery module of claim 1, wherein the first barrier and the second barrier include an insert hole generally corresponding to each insert.

4. The secondary battery module of claim 1, wherein the first barrier and the second barrier include an insert groove generally corresponding to each insert.

5. The secondary battery module of claim 1, wherein the first barrier and the second barrier include a protrusion hole generally corresponding to each protrusion.

6. The secondary battery module of claim 1, wherein the first barrier and the second barrier include a protrusion groove generally corresponding to each protrusion.

7. A secondary battery module comprising:
a plurality of unit cells, each of the unit cells spaced from an adjacent one of the unit cells;

a first barrier located between adjacent ones of the unit cells;

a second barrier located between adjacent ones of the unit cells and spaced from the first barrier; and a plurality of spacers located between the first barrier and the second barrier, wherein each of the spacers includes a spacer body, and a protrusion protruding from one surface of the spacer body, the protrusion having an area smaller than an area of the spacer body, wherein the protrusion has inserts formed thereon.

8. The secondary battery module of claim 7, wherein the inserts are on the outer circumference of the protrusion and are formed on only one surface of the spacer body.

9. The secondary battery module of claim 7, wherein the first barrier or the second barrier includes an insert hole generally corresponding to each insert.

10. The secondary battery module of claim 7, wherein the first barrier or the second barrier includes an insert groove generally corresponding to each insert.

11. The secondary battery module of claim 7, wherein the first barrier or the second barrier includes a protrusion hole generally corresponding to each protrusion.

12. The secondary battery module of claim 7, wherein the first barrier or the second barrier includes a protrusion groove generally corresponding to each protrusion.

13. The secondary battery module of claim 1, wherein the first barrier and the second barrier each comprise a metal plate and an oxide layer on a surface of the metal plate.

14. The secondary battery module of claim 13, wherein the metal plate comprises aluminum.

15. The secondary battery module of claim 1, wherein the spacers are insulators.

16. The secondary battery module of claim 1, wherein the spacers are located between the first and second barriers such that a substantially constant distance is maintained between the first and second barriers.

17. The secondary battery module of claim 1, wherein a distance between spacer holes arranged at a central area of the first barrier and the second barrier is smaller than a distance between the spacer holes arranged at peripheral areas thereof.

* * * * *